Sept. 10, 1957    B. T. O'SHAUGHNESSY, JR    2,805,597
EXPANDING FASTENER FOR USE WITH MATERIALS OF VARYING THICKNESS
Filed May 25, 1953    2 Sheets-Sheet 1
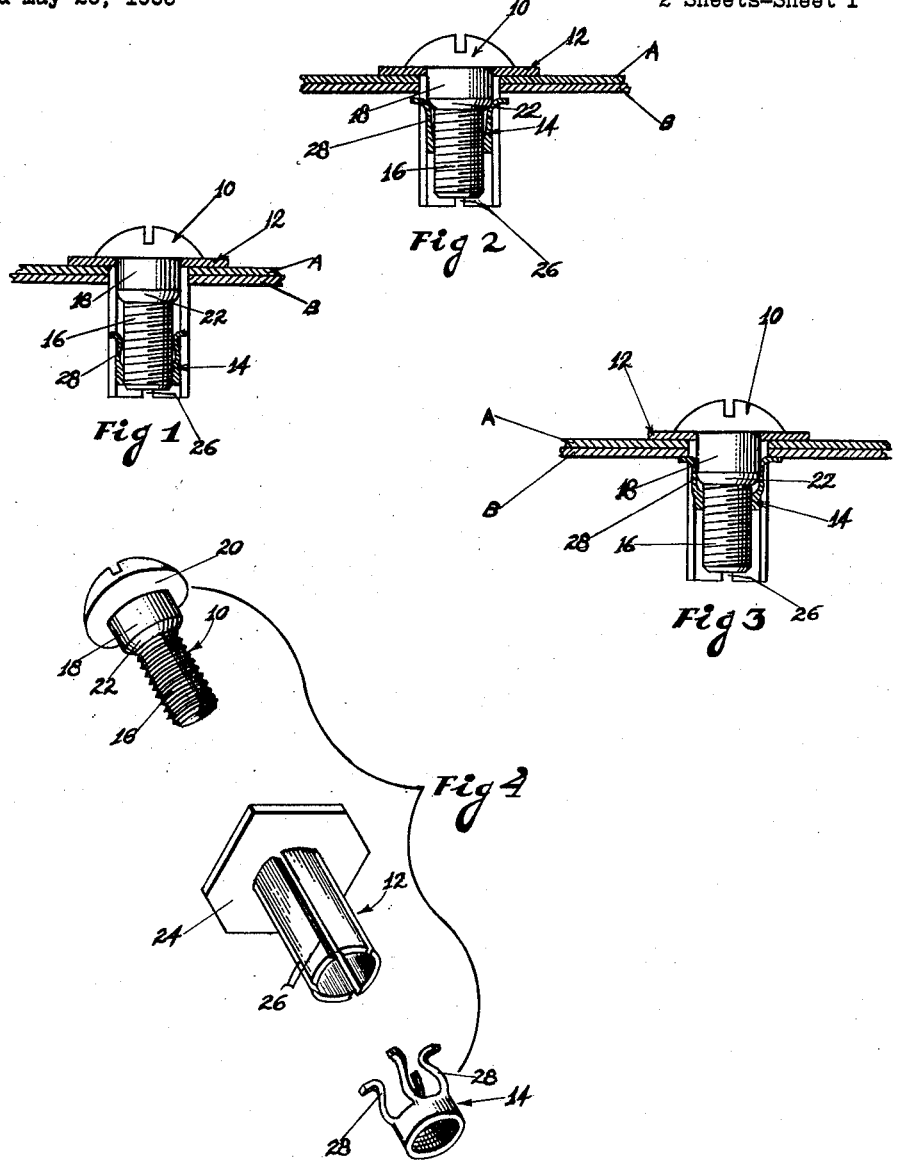
INVENTOR
BERNARD T. O'SHAUGHNESSY JR.
By Roger B. McCormick
ATTORNEY INVENTOR
BERNARD T. O'SHAUGHNESSY JR.
By Roger B. McCormick
ATTORNEY

# United States Patent Office 2,805,597
Patented Sept. 10, 1957

2,805,597

EXPANDING FASTENER FOR USE WITH MATERIALS OF VARYING THICKNESS

Bernard T. O'Shaughnessy, Jr., Hartford, Conn., assignor to The Preferred Engineering and Research Corporation, Hartford, Conn., a corporation of Connecticut Application May 25, 1953, Serial No. 357,271

2 Claims. (Cl. 85—2.4)

This invention relates to fastening devices and, more specifically, to improvements in blind fasteners.

"Blind fasteners" are utilized to hold a plurality of parts or objects together when one of the parts or objects is inaccessible making it impossible to use common fastening means such as bolts and nuts.

It is the general object of this invention to provide a blind fastener adaptable to a great many uses in connection with the assembly of elements of various sizes and shapes.

A more specific object of the invention is to provide a blind fastener which comprises a screw and nut adapted for operation from one side of the object to be assembled and which can be quickly and easily detached.

Other objects and advantages of the invention will become apparent to those skilled in the art from the following description of the annexed drawings which, by way of example only, illlustrates three forms of construction.

In the drawings:

Fig. 1 is a vertical cross-sectional view of a fastener constructed in accordance with the present invention and showing the fastener in operative position relative to two sheet-like pieces which are to be held together;

Fig. 2 is similar to Fig. 1 showing the fastener as it is tightened to hold the two pieces together;

Fig. 3 is similar to Figs. 1 and 2 but shows the fastening means tightened upon the two pieces;

Fig. 4 is an exploded perspective view of the fastening device shown in Figs. 1 to 3;

Figure 5:
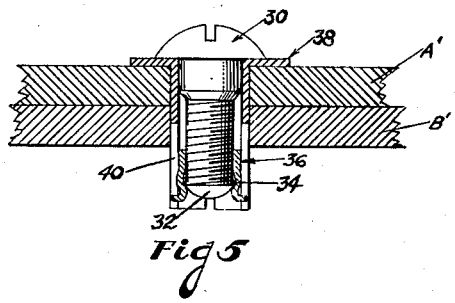
Fig. 5 is a vertical cross-sectional view of an alternative form of fastening device shown in operative position relative to two pieces.

While fastening devices incorporating the features of the present invention may be used in structures of various types where it is desired to secure two members together, the invention is found to be especially applicable in the fastening of metal plates which are accessible from one side only. In the accompanying drawings, the letters A and B denote two plate-like pieces or members which are held together by fasteners constructed in accordance with the present invention.

The fastener comprises a screw bolt 10, a sleeve 12, and a nut 14. The threaded portion 16 of the screw bolt is of reduced diameter and a larger diameter shank portion 18 is provided adjacent the head 20. As will be described in greater detail hereinafter, the shank portion 18 defines a cam surface 22 adjacent the threaded portion 16.

The sleeve 12 is provided with a flange 24 and a plurality of longitudinal slots 26, 26 which extend from the flange or head 24 through the end of the sleeve. Said slots are arranged in equally circumferentially spaced relationship and any number desired may be provided.

The nut 14 is adapted to be threaded upon the threaded shank of the bolt as shown in Fig. 1. Preferably, the nut is provided with a plurality of integrally formed spring arms 28, 28 equal in number to the slots 26, 26. Said spring arms can be independently formed and attached to the nut, but in any event should extend generally longitudinally to slide along the shank of the bolt when the bolt is turned to draw the nut. The said spring arms 28 are generally S-shaped and arranged so that their extending end portions are received within the elongated slots 26, 26 in the sleeve member 12.

As shown in Fig. 1, the fastening device is disposed in operative position relative to the plates A and B when the sleeve is inserted through registering openings provided in said plates and when the nut is threaded on the bolt with the extending tips of the spring arms disposed within the slots in the sleeve. It will be obvious to those skilled in the art that if the sleeve is held against rotation while the bolt is turned, the nut will be held against rotation by engagement of the spring arms 28, 28 with the sides of the slots 26, 26. Accordingly, turning of the bolt will move the nut along the threaded shank of the bolt. To facilitate holding the sleeve against rotation, the flange 24 thereof may be hexagonally formed as shown to receive a wrench or it may be otherwise formed and held as by a spanner wrench. The bolt head 20 may be slotted to receive a screw driver or may be fabricated in other tool receiving form.

When the nut 14 is drawn up the threaded shank of the bolt from the position in Fig. 1 to the position shown in Fig. 2, the upwardly longitudinally extending nut fingers 28 engage the cam surface 22 and are thrust outwardly to extend radially outwardly of the sleeve 12. Further drawing up or tightening of the nut on the threaded bolt shank portion will bring said extending portions of the spring arms 28 into engagement with the inaccessible side of the pieces to be held together.

The described device can be used to hold pieces of widely varying thicknesses. The only limitation upon the capacity of the fastener is imposed by the enlarged shank 18. The fastener cannot be used to hold together pieces having a total thickness exceeding the length of the shank 18. However, the fastener can be used to hold together pieces of any size provided the total thickness is less than the length of the shank 18.

Figure 6:
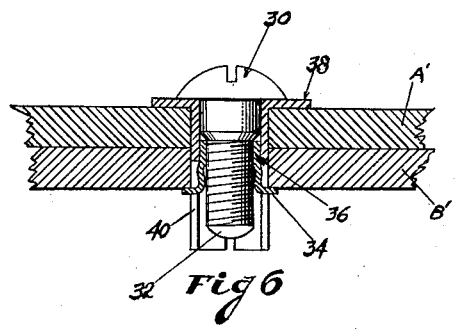
Fig. 6 shows the fastening device of Fig. 5 tightened upon the two pieces.

The embodiment of the invention shown in Figs. 5 and 6 is particularly adapted to fasten pieces of relatively great thickness such as the pieces A' and B' shown. The fastening device of Figs. 5 and 6 is modified only in details of construction. For example, the screw or bolt 30 is similar to the previously described bolt with the exception that the bolt 30 is provided with a parti-spherical tip or end 32. The spherical portion 32 provides the cam means for spreading the fingers 34 on the nut 36. The nut 36 is similar to the previously described nut 14 but is provided with spring arms 34, 34 having free ends extending a greater distance radially than the free ends of the arms on the nut 14. The spring arm arrangement is such that they will be spread sufficiently for engagement with the inaccessible surface of the pieces when the said arms are engaged by the threaded portion of the shank of the bolt 30. The sleeve 38 shown in Figs. 5 and 6 is substantially the same as the previously described sleeve 12. However, the slots 40, 40 provided on the sleeve 38 do not extend from the flange head of the sleeve to the free end thereof. Instead, the slots 40 extend from the free end through only about half the length of the sleeve.

As shown in Fig. 6, the nut fingers or arms 34, 34 are spread by the rounded tip 32 as the nut is drawn upwardly on the bolt 30. When completely spread, the fingers engage the threaded shank of the bolt and extend radially outwardly through the slots 40, 40 in the sleeve 30 so as to engage the inaccessible surface of the pieces.

It will be understood that the embodiment shown in Figs. 5 and 6 is particularly adapted to hold or secure pieces of relatively great thickness.

Figure 7:
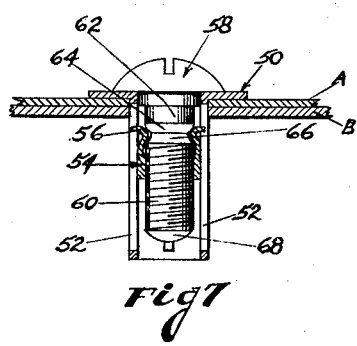
Fig. 7 is a vertical cross-sectional view of another alternative form of construction.
Figure 8:
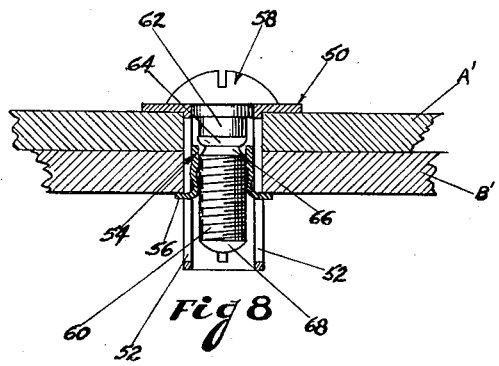
Fig. 8 is an additional vertical cross-sectional view of the fastener shown in Fig. 7.

A further embodiment of the fastening device is shown in Figs. 7 and 8. This embodiment combines the features of the first two described embodiments and accordingly the fastening device can be utilized to assemble pieces which may vary as to thickness throughout a very wide range.

The sleeve 50 used in this embodiment is generally similar to the first described sleeve 12 in that the sleeve is provided with a flanged head and elongated longitudinally extending slots 52, 52. The sleeve 50 is modified in that the slots 52, 52 do not extend from the head clear through the free end of the sleeve. Instead, the slots extend from the head towards the other end but terminate in spaced relationship to said other end.

The nut 54 shown in Figs. 7 and 8 is generally similar to the previously described nuts. The nut 54 has a plurality of arms 56, 56 having radially outwardly projecting ends which are arranged to extend into and to be confined within the slots 52, 52 when the nut is threaded upon the bolt 58 with the nut arms extending generally longitudinally upwardly or downwardly. To accommodate the nut with the arms extending upwardly or downwardly, the bolt 58 is provided with the usual threaded shank 60 and an unthreaded shank portion 62 adjacent thereto. An arm spreading, radially extending cam face 64 is defined on the shank 62 adjacent the threaded portion 60. Said cam face 64 forms one side or wall of an annular, generally V-shaped groove 66 adapted to receive the spring arms 56, 56 when extended upwardly and prior to spreading thereof. The wall 64 is on the side of the groove 66 adjacent the head of the bolt. This arrangement is best shown in Fig. 7.

The screw or bolt 58 is also provided with a partispherical cam tip 68 which can also be described as an inclined, radially extending cam surface on the free end of the bolt shank and which is adapted to spread the fingers when the nut 54 is placed upon the bolt with the arms extending downwardly as shown in Fig. 8. It will be apparent that the spring arms 56, 56 can be spread by cam face 64 or by cam face 68 to extend through the slots 52, 52 and into engagement with the inaccessible surface of the pieces.

It will be understood that the fastening device described in connection with Figs. 7 and 8 can be used similarly to the fastening device shown in Figs. 1 to 4 to grip or hold relatively thin pieces or it can be used similarly to the device described in connection with Figs. 5 and 6 to grip the substantially thicker pieces.

When the fastening device of any of the forms described is loosely assembled, that is, when the nut is threaded upon the bolt with the nut fingers extending into the slots in the sleeve, the nut, bolt and sleeve cannot be inadvertently separated. This feature facilitates use of the fastener since it can be picked up as a one-piece article and inserted within a hole extending between two pieces to be fastened together. The head or flange of the sleeve is then held as by a spanner wrench while the bolt is turned by a screw driver or equivalent tool to draw the nut against the inaccessible surface of the pieces.

The fastening device can be detached as easily as it is attached by merely holding the sleeve while turning the bolt so as to bring the nut out of engagement with the inner or inaccessible surface of the piece. When the nut has been taken out of engagement with the work and advanced along the threaded shank of the bolt until the nut fingers are drawn inwardly and disposed entirely within the slots in the sleeve, the fastening device can then be removed from the hole extending through the workpieces.

It is believed that additional modifications of the fastening device can be effected without departing from the scope of the invention and, therefore, it is not the intention to limit the invention to the specific examples shown and described otherwise than indicated by the claims which follow.

I claim as my invention:

1. A blind fastener adapted to be inserted within registering openings in pieces to be fastened together and to fasten said pieces by engagement with an accessible surface at one end of the openings and an inaccessible surface at the other end thereof, the said fastener comprising in combination, a bolt having a head and a shank provided with an annular groove between its ends, the said groove having an inclined wall on the side thereof adjacent the head which inclined wall provides a radially extending annular cam surface and the said bolt also having an inclined surface on the free end of its shank which also provides a radially extending annular cam surface, a nut adapted for threaded engagement with the bolt and having at least one generally longitudinally extending spring arm selectively engageable with the radially inner end of one of the said cam surfaces when the nut is threaded on the bolt, the said spring arm having a radially outwardly projecting end, and a sleeve surrounding said bolt shank and having at least one longitudinally extending slot arranged to receive and to confine the radially extending end of the spring arm, whereby the bolt can be turned within the sleeve to draw the nut along its shank and thereby spread said arm radially by engagement with the said one cam surface to extend the end of the arm through the slot in the sleeve for engagement with the inaccessible surface when the sleeve and bolt are extended through the registering openings in the aforesaid relationship.

2. A blind fastener adapted to be inserted within registering openings in pieces to be fastened together and to fasten said pieces by engagement with an accessible surface at one end of the openings and an inaccessible surface at the other end thereof, the said fastener comprising in combination, a bolt having a head and a shank provided with an annular generally V-shaped groove between its ends, the inclined wall of the groove on the side thereof adjacent the head providing a radially extending annular cam surface, and the said bolt also having an inclined surface on the free end of its shank which also provides a radially extending annular surface, a nut adapted for threaded engagement with the bolt and having a plurality of generally longitudinally extending spring arms which are simultaneously engageable within said groove and simultaneously engageable with the radially inner end of the cam surface defined therein when the nut is threaded on the bolt with the said arms extending toward the bolt head, said arms also being simultaneously engageable with the radially inner end of the cam surface on the free end of the shank when the nut is threaded on the bolt with the arms toward the free end of the bolt shank, said arms having radially outwardly projecting ends, and a sleeve surrounding said bolt shank and having a plurality of longitudinal slots respectively receiving and confining the radially extending ends of the said arms whereby the bolt can be turned within said sleeve to draw the nut along its shank and thereby radially spread said arms by engagement with either of the said cam surfaces to radially extend the ends of the arms through the said slots for engagement with the inaccessible surface when the sleeve and bolt are extended through the registering openings in their aforesaid relationship.

References Cited in the file of this patent

UNITED STATES PATENTS

| | | |
|---|---|---|
| 626,040 | Rowlands | May 30, 1899 |
| 784,845 | Evans | Mar. 14, 1905 |
| 2,024,871 | Parsons | Dec. 17, 1935 |
| 2,376,279 | Schlenkert | May 15, 1945 |
| 2,387,468 | Ritzel | Oct. 23, 1945 |
| 2,404,169 | Gidden | July 16, 1946 |
| 2,516,554 | Coyne | July 25, 1950 |